United States Patent
Valente et al.

(10) Patent No.: US 8,350,961 B2
(45) Date of Patent: Jan. 8, 2013

(54) SYSTEM AND METHODS FOR THE SIMULTANEOUS DISPLAY OF MULTIPLE VIDEO SIGNALS IN HIGH DEFINITION FORMAT

(76) Inventors: Geno Valente, Naperville, IL (US); Mary Beth Valente, Naperville, IL (US)

( * ) Notice: Subject to any disclaimer, the term of this patent is extended or adjusted under 35 U.S.C. 154(b) by 1261 days.

(21) Appl. No.: 11/789,577

(22) Filed: Apr. 24, 2007

(65) Prior Publication Data

US 2007/0252912 A1 Nov. 1, 2007

Related U.S. Application Data

(60) Provisional application No. 60/794,432, filed on Apr. 24, 2006.

(51) Int. Cl.
*H04N 7/01* (2006.01)
*H04N 11/20* (2006.01)
*H04N 7/173* (2006.01)
*G06F 13/14* (2006.01)
*G09G 5/02* (2006.01)

(52) U.S. Cl. ........ 348/441; 348/458; 345/520; 345/698; 725/112; 725/114

(58) Field of Classification Search .................. None
See application file for complete search history.

(56) References Cited

U.S. PATENT DOCUMENTS

| | | | |
|---|---|---|---|
| 5,905,536 A * | 5/1999 | Morton et al. ................ | 348/441 |
| 6,707,467 B1 * | 3/2004 | Suga ............................. | 345/698 |
| 6,785,906 B1 * | 8/2004 | Gaughan et al. ............. | 725/112 |
| 6,959,449 B1 | 10/2005 | Fujii | |
| 2005/0122335 A1 * | 6/2005 | MacInnis et al. ............ | 345/520 |
| 2005/0179702 A1 * | 8/2005 | Tomlinson et al. .......... | 345/629 |
| 2007/0064127 A1 | 3/2007 | Millar | |
| 2007/0180485 A1 * | 8/2007 | Dua ............................. | 725/114 |

* cited by examiner

*Primary Examiner* — Jefferey Harold
*Assistant Examiner* — Sean Haiem
(74) *Attorney, Agent, or Firm* — Slater & Matsil, L.L.P.

(57) ABSTRACT

A scaling engine, blending mechanism, memory controller, frame buffer and video driver are included within a semiconductor, such as a Field Programmable Gate Array (FPGA), to provide broadcasting of signals at a high resolution format by combining two or more low resolution video signals to create a high resolution signal in real-time High Definition format, such as 1080p. The high resolution signals can be concurrently displayed as one or more image areas on a display device in any contemplated size, number and arrangement.

12 Claims, 5 Drawing Sheets

SYSTEM AND METHODS FOR THE SIMULTANEOUS DISPLAY OF MULTIPLE VIDEO SIGNALS IN HIGH DEFINITION FORMAT

This application claims priority of U.S. Provisional Application No. 60/794,432 filed Apr. 24, 2006.

FIELD OF THE INVENTION

The present invention relates generally to electronics, and more particularly to combining two or more video signals for simultaneous display in real-time High Definition format.

BACKGROUND OF THE INVENTION

Broadcasting is the distribution of an audio and/or video signal that ultimately transmits to an audience. There are wide varieties of broadcasting systems, all of which have different capabilities. The smallest broadcasting systems are institutional public address systems, which transmit verbal messages and music within a school or hospital, and low-powered broadcasting systems which transmit radio stations or television stations to a small area. National radio and television broadcasters have nationwide coverage, using retransmitter towers, satellite systems, and cable distribution. Satellite radio and television broadcasters can cover even wider areas, such as entire continents, and Internet channels can distribute text or streamed music worldwide.

Traditionally, a video signal is transmitted in Standard Definition (SD) format according to the National Television Standards Committee (NTSC) standard in the United States. Other SD formats include Phase Alternation Line (PAL) and Sequentiel Couleurs a Memoire (SECAM).

More recent, High Definition (HD) format is used to transmit a video signal, which provides higher resolution than Standard Definition (SD). For example, resolution formats include 720p, 1080i, 1080p, 2K, 4K to name a few. High Definition (HD) also includes Extreme High Definition (XHD) with a format of 4 x1080i/2x1080p and Extreme Definition (XD) at 1440p. These resolution formats convey lines of pixels in a specified vertical and horizontal arrangement, with the lines either interlaced (i) or progressive (p). Resolution is the degree of sharpness of an image as the number of pixels across and down on a display device.

A video signal transmitted in High Definition format is typically viewed on a display device that supports HD broadcasting. These display devices include for example, Personal Computer (PC) systems, High Definition Televisions (HDTV), Home Theater Personal Computers (HTPC), High Definition camcorders and projectors.

Currently, broadcasting systems fail to provide a high resolution High Definition format, such as 1080p. In addition, current display devices are not capable of providing more than one video signal in high resolution High Definition format, and furthermore, in real-time. Current display devices further lack the ability to illustrate more than one high resolution High Definition image concurrently on the same display device.

It would be advantageous to provide a system and methods of broadcasting a video signal in high resolution High Definition format, such as 1080p. Furthermore, it would be advantageous to provide a system and methods for broadcasting a video signal in high resolution High Definition format in real-time. It would also be advantageous broadcast a video signal in a high resolution High Definition format by combining two or more, or multiple, low resolution video signals for simultaneous display. It further would be advantageous to illustrate the video signals as two or more images concurrently on a display device.

There is a demand to simultaneously display two or more low resolution video signals in High Definition format, and in addition, in real-time. There is also a demand to illustrate more than one high resolution High Definition image on a single display device. The present invention satisfies this demand.

SUMMARY OF THE INVENTION

The present invention allows the simultaneous display of two or more video signals in real-time High Definition format. Two or more low resolution video signals are combined and broadcasted simultaneously in a high resolution High Definition format, such as 1080p. Furthermore, the present invention allows broadcasting of video signals in a high resolution High Definition format in real-time.

The present invention also allows for illustration of the video signals as an image, or image area, on a display device, where two or more image areas can be illustrated concurrently. Video signals include, but are not limited to, Internet content, gaming content, entertainment content, and television content. The video signals are illustrated on the display device as image areas, such as text, files, movies, graphics, clip art, photos, videos, sounds, advertisements, pictures, images, podcasts, wav files, hyperlinks, code, animations, instant messaging, and gaming to name a few. It is contemplated that video signal further includes aural information, i.e., sound.

According to the present invention, each video signal is received from an input device, such as Personal Computer (PC) systems, Home Theatre Personal Computers (HTPC), High Definition camcorders, set-top box, broadcast systems, such as satellite and cable, Digital Video Disc (DVD), video game console, and Internet to name a few.

Another aspect of the present invention includes accessing servers for downloading customizable Internet content. Internet content includes, for example, Really Simple Syndication or Rich Site Summary (RSS) feeds, HyperText Markup Language (HTML), images in formats such as Joint Photographic Experts Group (JPEG), JPEG2000, Joint Bi-level Image Experts Group (JBIG), and Moving Picture Experts Group (MPEG), to display image areas on the display device.

The video signal received is manipulated by a scaling engine. For example, a scaling engine manipulates resolution, size of an active or still image, movement or no movement of the image, speed of such movement, zooming of the image, and stretching of the image.

After each video signal is scaled, all the signals are blended per a blending mechanism. The blending mechanism changes the transparency of each signal such as via alpha blending. Alpha blending is the process of combining a translucent foreground color with a background color, thereby producing a new blended color. The degree of the translucency of the foreground color may range from completely transparent to completely opaque. If the foreground color is completely transparent, the blended color will be the background color. Conversely, if it is completely opaque, the blended color will be the foreground color. Of course, the translucency can range between these extremes, in which case the blended color is computed as a weighted average of the foreground and background colors.

After the signals are blended, a memory controller receives the signals and fills a frame buffer. The memory controller assembles the signals by determining the placement, or location, of the signals and resolving the timing of the placement of the signals within the frame buffer. The frame buffer is a frame, or table, of data regarding each video signal. The table includes data of the signal, such as color values for every pixel, color depth, palette size and pixel transparency. The placement of each signal within the frame buffer essentially drives the image areas on the display device.

A video driver reads the frame buffer and formats the signals according to television standards. According to the present invention, the signals are formatted to a high resolution, such that more than one video signal at a low resolution, for example 720p, can be assembled within the frame buffer to create a high resolution High Definition signal, such as 1080p.

The video driver then sends the signals via an interface to a display device. The interface is, for example, composite video or a High Definition Multimedia Interface (HDMI). HDMI provides an all-digital audio/video interface between any compatible digital audio/video input device and output device.

A display device is any device that supports HD broadcasting, for example, Personal Computer (PC) systems, High Definition Televisions (HDTV), digital television (DTV), Home Theater Personal Computers (HTPC), High Definition camcorders and projectors. The display device displays two or more video signals in real-time High Definition format. The display device further includes one or more audio elements, for example amplifiers, headphones, directional audio system, speakers, microphone, to receive and/or transmit sound such as voice.

The video signals are illustrated on the display device as image areas. The image areas illustrate text, files, movies, broadcasts graphics, clip art, photos, videos, sounds, advertisements, pictures, images, podcasts, wav files, hyperlinks, code, animations, instant messaging, and gaming, for example.

The scaling engine, blending mechanism, memory controller, frame buffer and video driver are included within a semiconductor such as, a Field Programmable Gate Array (FPGA), Integrated Circuit (IC), Application Specific Integrated Circuit (ASIC), or Structured ASIC.

The semiconductor devices according to the present invention can be programmed with firmware. Firmware can include custom instructions and specific tasks, for example, real-time functions applied to the video signals.

An object of the present invention is to broadcast a high resolution format. According to the present invention, two or more video signal at a low resolution can be assembled to create a high resolution High Definition signal.

Another object of the present invention is display two or more video signals simultaneously on a display device in High Definition format. Two or more video signals are combined and displayed simultaneously on a display device.

Another object of the present invention is display two or more video signals simultaneously on a display device in High Definition format real-time.

Another object of the present invention is to display two or more video signals as an image, or image area, on a display device.

Another object of the present invention is to display two or more image areas on a display device in any contemplated size, number and arrangement.

Another object of the present invention is to provide superior quality images displayed on the display device.

Yet another object of the present invention is to provide a more economical solution than prior art systems and methods.

Another object of the present invention is to provide concurrent entertainment. For example, one user can "surf" the Internet while another user communicates via instant message while yet another user watches a television program, all on the same display device.

Additionally, the present invention allows for parental control and policing, for example a child using the Internet to instant message, while watching television concurrently.

The present invention and its attributes and advantages will be further understood and appreciated with reference to the detailed description below of presently contemplated embodiments, taken in conjunction with the accompanying drawings.

DETAILED DESCRIPTION OF EMBODIMENTS OF THE INVENTION

Figure 1:
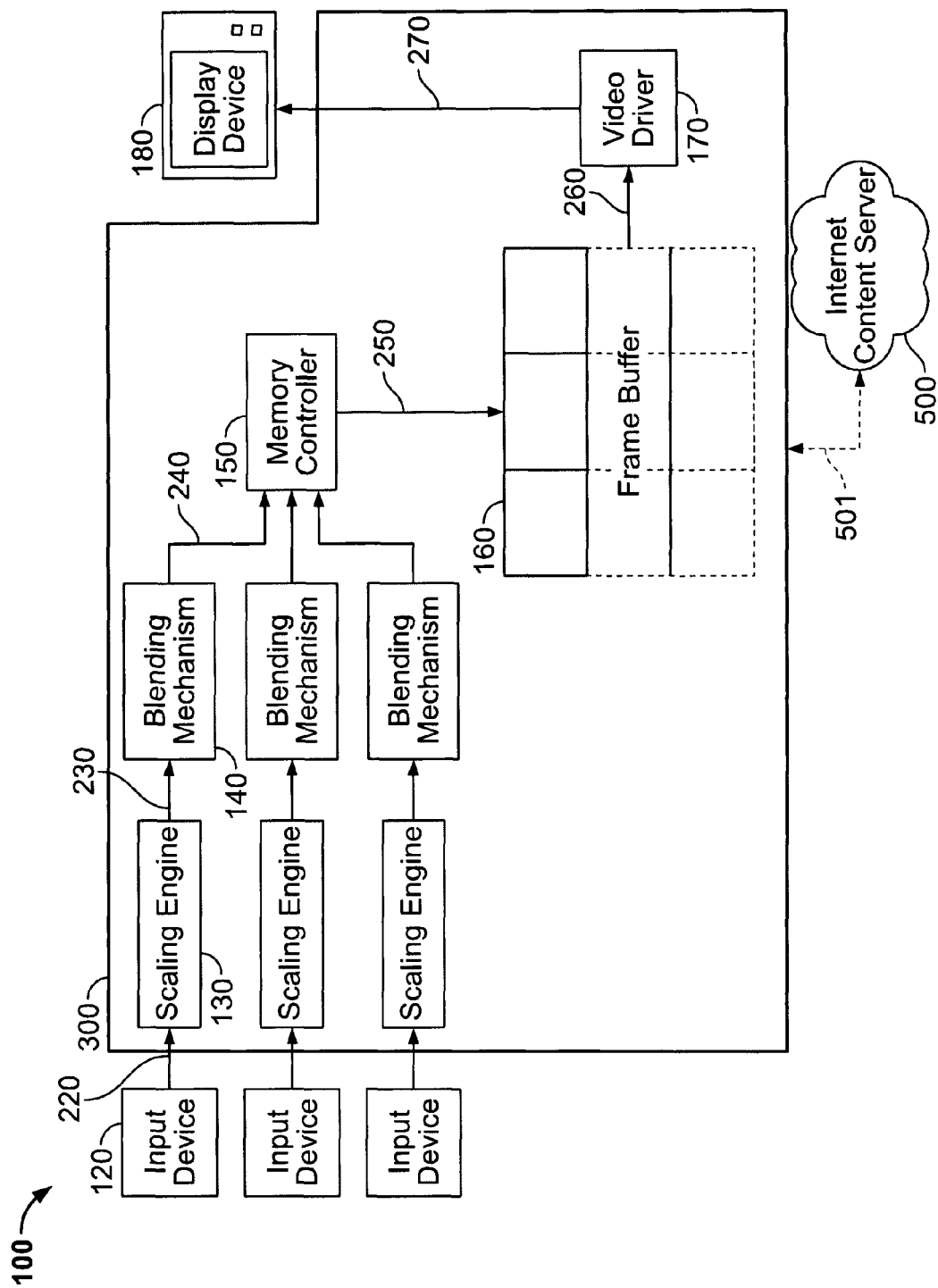
FIG. 1 is a block diagram illustrating an embodiment to simultaneous display two or more video signals in real-time High Definition format according to the present invention.

FIG. 1 is a block diagram illustrating an embodiment 100 of the present invention to simultaneous display two or more video signals in real-time High Definition format. Here, three video inputs are shown, although any number or video inputs are contemplated.

Each input device 120 transmits a signal 220 to a scaling engine 130. Input devices, as discussed above, may include Personal Computer (PC) systems, broadcast systems, Home Theatre Personal Computers (HTPC), High Definition camcorders, set-top box, Digital Video Disc (DVD), video game console, and Internet. The scaling engine 130 manipulates the signal 220. For example, a scaling engine can manipulate size of an active or still image, movement or no movement of the image, speed of such movement, zooming of the image, and stretching of the image. After scaling, the scaled signals 230 are blended per a blending mechanism 140. The blending mechanism 140 uses alpha blending or other techniques to change the transparency of each signal. The blended signals 240 are transmitted to a memory controller 150 that determines the configuration of the signals and sends them via 250 to the frame buffer 160. The memory controller 150 determines the placement, or location, of the signals and resolves the timing of the placement of the signals within the frame buffer 160. A video driver 170 receives the content of the frame buffer 160 via 260. The video driver 170 formats the signals of the frame buffer 160 according to television standards, and sends the signals via an interface 270 to a display device 180. Here, the interface 270 is a High Definition Multimedia Interface (HDMI). HDMI provides an all-digital audio/video interface between any compatible digital audio/video input devices.

The display device 180 simultaneously displays two or more video signals in real-time High Definition format. Display devices, as discussed above, may include Personal Computer (PC) systems, High Definition Televisions (HDTV), digital television (DTV), Home Theater Personal Computers (HTPC), High Definition camcorders and projectors. One or more audio elements allows for real-time communication such that sound can receive and transmit to one or more users concurrently. Thus, two or more users can view all or a specific image area displayed on the display device while individually listening to its corresponding sound.

According to the present invention, the scaling engine 130, blending mechanism 140, memory controller 150, frame buffer 160 and video driver 170 are part of a semiconductor 300. According to this embodiment, semiconductor 300 is a Field Programmable Gate Array (FPGA). The FPGA contains programmable logic components and programmable interconnects to achieve the functions of the present invention. The FPGA can be programmed after manufacture such that it can perform whatever logical function is needed.

Figure 2:
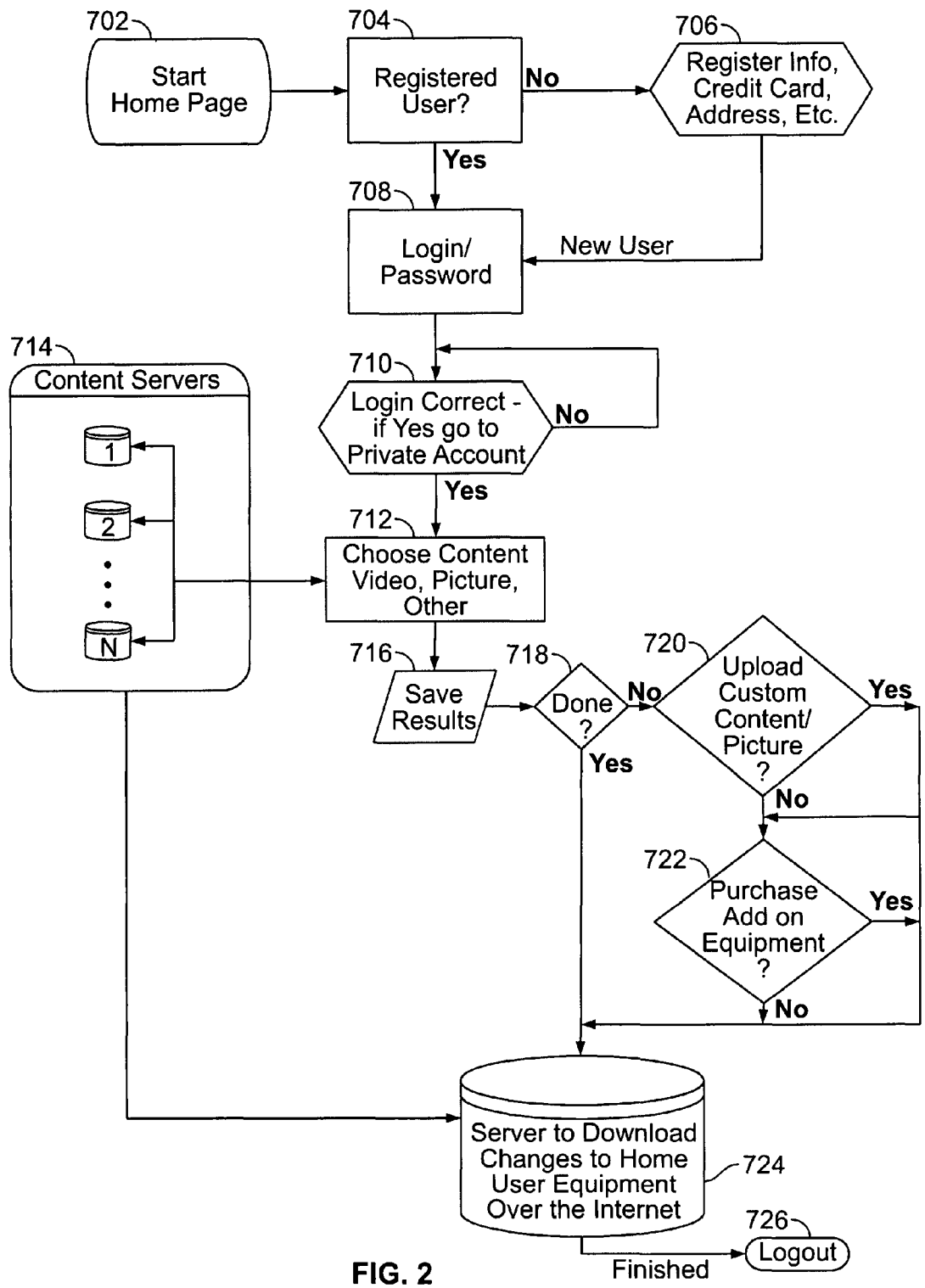
FIG. 2 is a flow chart illustrating an embodiment to access and download customizable Internet content according to the present invention.

Another aspect of the present invention includes accessing servers 500 for downloading 501 customizable Internet content to display image areas on the display device, as described in more detail in FIG. 2.

FIG. 2 is a flow chart of an embodiment to access and download customizable Internet content according to the present invention. A user can visit a webpage 702 in the Internet. If the user is not a registered user 704, the user can enter information 706, such as name, address, credit card information, to access the Internet content. Once the user enters the information 706, or the user is registered, the user enters a login and password 708. Once the login and password 708 are verified 710, the user can select the Internet content 712 to download. Once the Internet content is selected 712, servers provide the corresponding selections 714, which are saved 716. If the user is finished 718 with the selections, they are downloaded 724 to the display device. Besides the Internet content selection 712, a user can also upload various other content 720, such as entertainment content, to the display device. Likewise, a user can purchase additional equipment 722, such as hardware for additional functionality, including Digital Video Recording (DVR), camera security system. It is contemplated that with the additional camera security system functionality, a user can see who is at the front door via an image area on the display device. The image area can further "pop up" when is the security system is activated. Hardware can also include an after market box or card to expand the number of input devices. Additional equipment 722 can also include software for additional functionality, including payment of advertisements, service fees, etc. Upon downloading 724 the Internet content selected 714, the user logs out 726 of the webpage.

Figure 3:
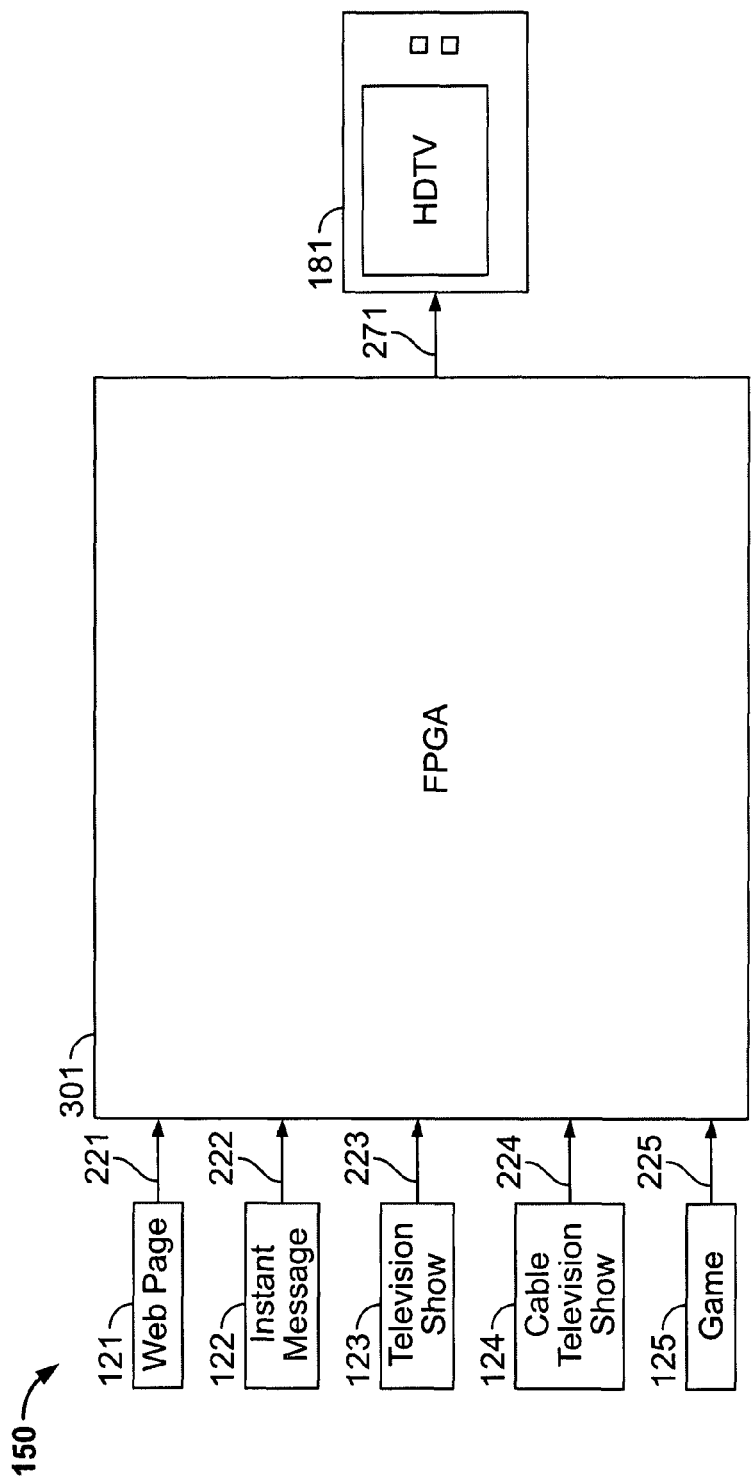
FIG. 3 is a block diagram illustrating another embodiment to simultaneous display two or more video signals in real-time High Definition format according to the present invention.

FIG. 3 is a block diagram illustrating another embodiment 150 to simultaneous display of two or more video signals in real-time High Definition format according to the present invention. Field Programmable Gate Array (FPGA) 301, receives signals 221, 222, 223, 224, 225 from input devices 121, 122, 123, 124, 125. Input device 121 provides Internet content, either public content or customizable content, such as that described in reference to FIG. 2. Input device 122 provides instant messaging video signals 222. Input devices 123, 124 each provide television video signals 223, 224. Input device 125 provides gaming video signals.

The FPGA combines the video signals 221, 222, 223, 224, 225 and sends them over a HDMI interface 271 to a HDTV 181 for simultaneous viewing. The signals are illustrated as image areas, as shown in FIGS. 4 and 5, on the HDTV 181 in real-time High Definition format.

Figure 4:
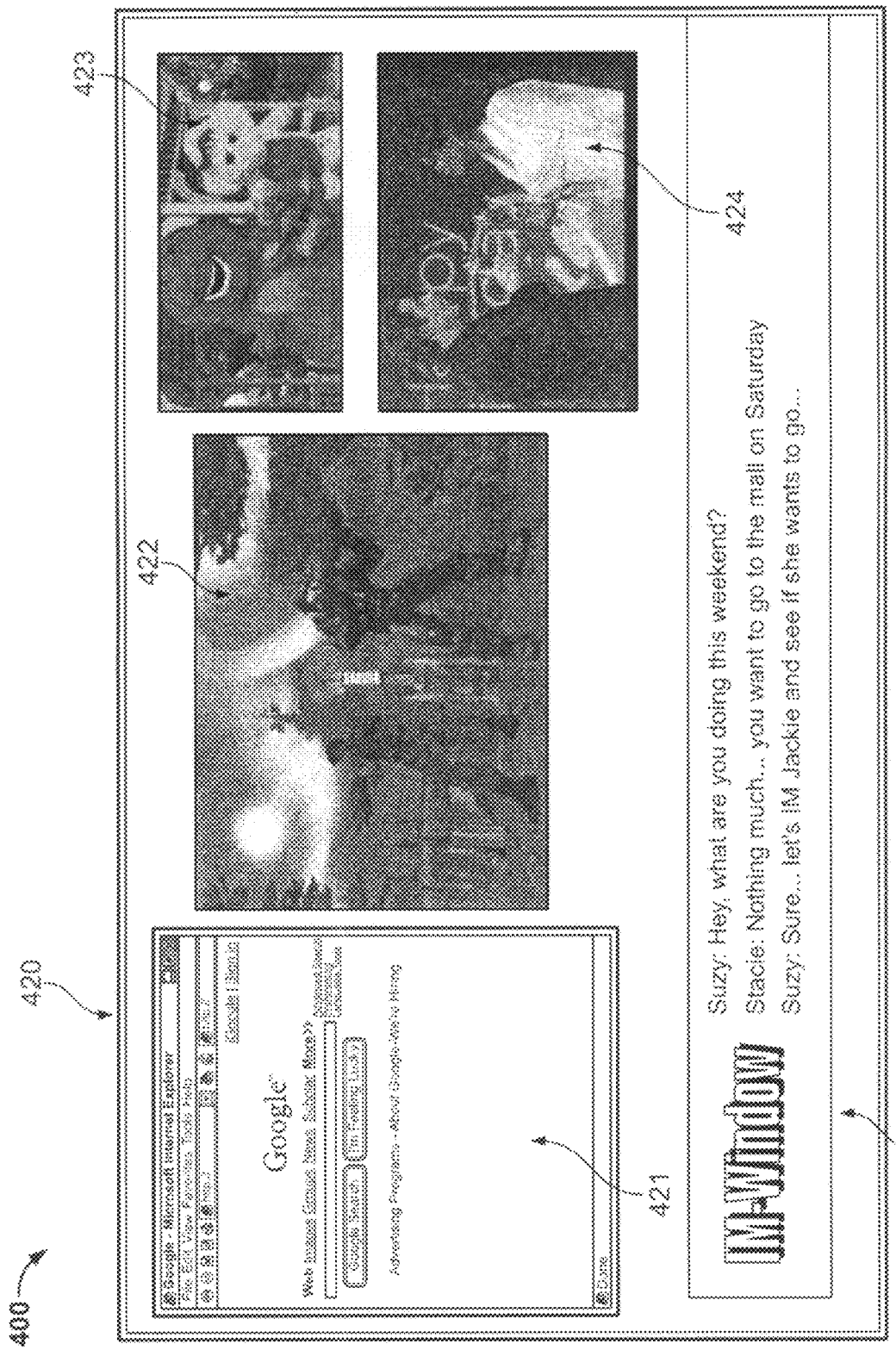
FIG. 4 is screen shot illustrating an embodiment of image areas on a display device according to the present invention.
Figure 5:
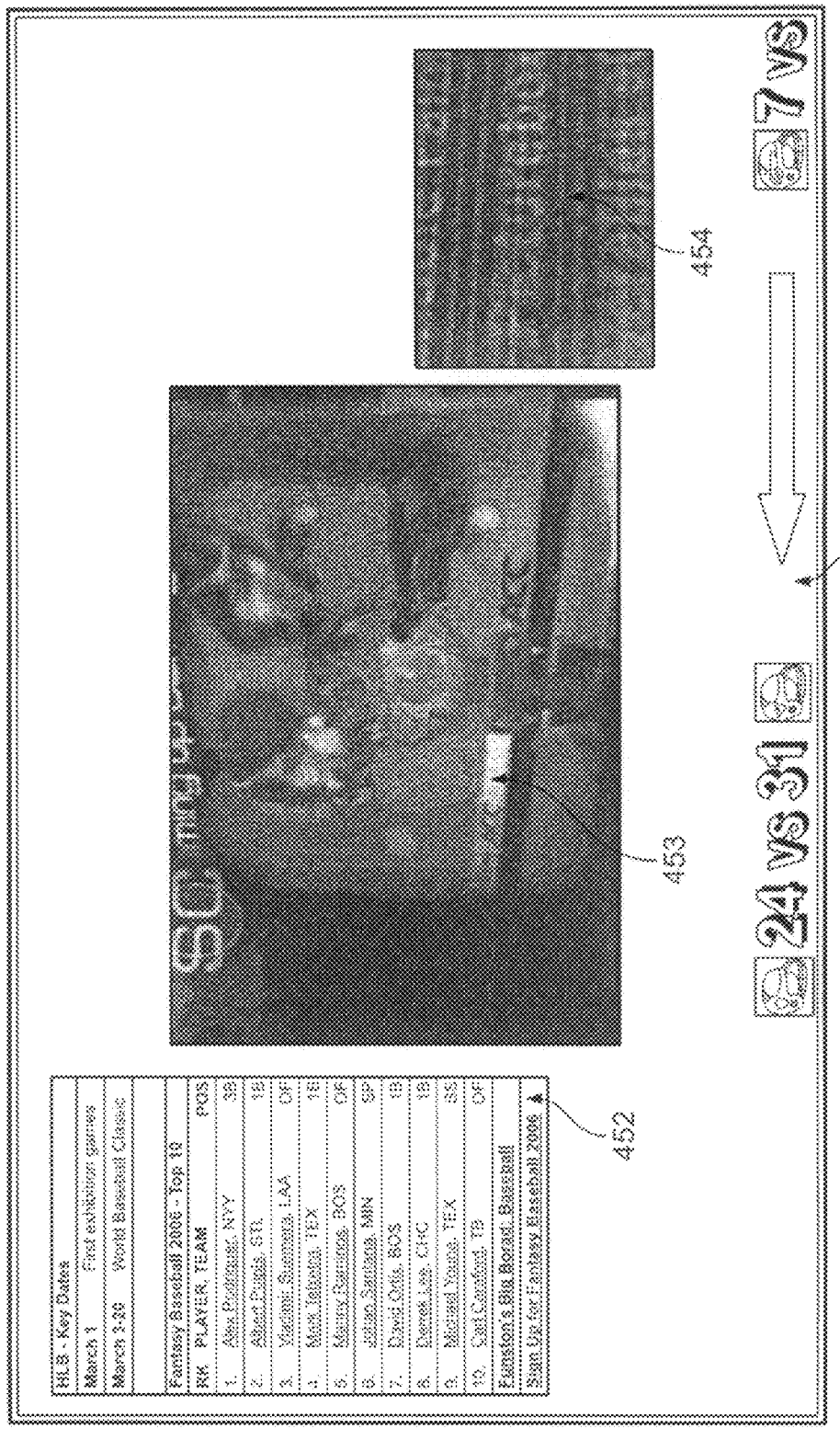
FIG. 5 is screen shot illustrating another embodiment of image areas on a display device according to the present invention.

FIG. 4 is screen shot 400 illustrating an embodiment of display device of image areas 420. Internet content is shown as a web page 421, concurrently with a video game 422, child program 423, digital video recorded (DVR) adult program 424, and instant messaging 425. FIG. 5 is screen shot 450 illustrating another embodiment of a display device of image areas 420; real-time informational ticker from the Internet 451, JPEG graphic 452, still picture 453 and computer file 454. Each image area 420 is concurrently displayed in real-time High Definition format.

It is contemplated that the image areas 420 can be illustrated in any arrangement and number, as well as in any size (zoom/stretch/scale), movement, speed of such movement, to create the image areas.

In addition, one or more audio elements allows for real-time communication such that sound can receive and transmit to one or more users simultaneously. Thus, a user can view all or a specific image area displayed on the display device while individually listening to its corresponding sound.

While the disclosure is susceptible to various modifications and alternative forms, specific exemplary embodiments thereof have been shown by way of example in the drawings and have herein been described in detail. It should be understood, however, that there is no intent to limit the disclosure to the particular embodiments disclosed, but on the contrary, the intention is to cover all modifications, equivalents, and alternatives falling within the scope of the disclosure as defined by the appended claims.

What is claimed is:

1. A method for downloading and customizing Internet content to one or more display image areas of a display device, while simultaneously displaying television content comprising a customized computer program that performs the steps of:

enabling access to one or more content servers, wherein the one or more content servers includes a plurality of Internet content, the plurality of Internet content comprising Really Simple Syndication or Rich Site Summary (RSS) feeds, documents in formats including HyperText Markup Language (HTML), images in formats including Joint Photographic Experts Group (JPEG), JPEG2000, Joint Bi-level Image Experts Group (JBIG), and videos in formats including Moving Picture Experts Group (MPEG);

validating information of a user to permit a request to access the plurality of Internet content;

receiving a selection of one or more Internet content chosen from the plurality of the Internet content to obtain selected Internet content;

downloading the selected Internet content from the one or more content servers over an Internet connection;

customizing the selected Internet content by recreating the selected Internet content specific to the user to obtain customized Internet content, the customized Internet content including text, files, movies, graphics, clip art, photos, videos, sounds, advertisements, pictures, images, podcasts, way files, hyperlinks, code, animations, instant messaging, real-time informational ticker, and gaming;

blending the selected Internet content with television content into a video signal;

assembling the video signal into a frame buffer;

reading the frame buffer;

formatting the video signal into a high resolution video signal;

sending the high resolution video signal over an interface; and illustrating the high resolution video signal on a display device, wherein the high resolution video signal includes the simultaneous display of the customized Internet content and the television content each presented on the display device in image areas separate and apart from one another.

2. The method according to claim 1, wherein said blending step further comprises the step of changing the transparency of the video signal.

3. The method according to claim 1, wherein the video signal is in a 720p format.

4. The method according to claim 1, wherein the high resolution video signal is in a 1080p format.

5. The method according to claim 1, wherein the information of the user is credit card information of the user.

6. The method according to claim 1, wherein the information of the user is a login and a password.

7. The method according to claim 1, wherein the display device is one selected from the group comprising of: a personal computer, a digital television, a high definition television, a camcorder, a projector, and a home theater personal computer.

8. A system for harmonizing television content and Internet content for a user, comprising:

a television display device;

a customized computer program that enables access to one or more content servers, wherein the one or more content servers includes a plurality of Internet content, the plurality of Internet content comprising Really Simple Syndication or Rich Site Summary (RSS) feeds, documents in formats including HyperText Markup Language (HTML), images in formats including Joint Photographic Experts Group (JPEG), JPEG2000, Joint Bi-level Image Experts Group (JBIG), and videos in formats including Moving Picture Experts Group (MPEG);

a plurality of input devices, wherein each input device downloads the Internet content selected by the user from the plurality of Internet content to obtain selected Internet content upon validation of a request by the user to access the Internet content and each input device downloads the selected Internet content from one or more content servers through an Internet connection to obtain downloaded Internet content;

a computing system configured to receive the downloaded Internet content, the computing system further comprising:

a scaling engine, wherein the scaling engine receives the downloaded Internet content and recreates the downloaded Internet content specific to the user to obtain customized Internet content, the customized Internet content including text, files, movies, graphics, clip art, photos, videos, sounds, advertisements, pictures, images, podcasts, way files, hyperlinks, code, animations, instant messaging, real-time informational ticker, and gaming, the scaling engine further manipulates the customized Internet content and television content to obtain a scaled Internet content and a scaled television content;

a blending mechanism, wherein the blending mechanism blends the scaled Internet content and the scaled television content to obtain one or more video signals;

a memory controller, wherein the memory controller receives the one or more video signals;

a frame buffer, wherein the frame buffer receives the one or more video signals from the memory controller and assembles the one or more video signals to determine placement of the one or more video signals within the frame buffer;

a video driver, wherein the video driver read the one or more video signals from the frame buffer and formats the one or more video signals into one or more high resolution video signals;

a display device, wherein the display device receives the one or more high resolution video signals from the video driver and concurrently illustrates the downloaded Internet content in a first image area and the television content in a second image area, the first image area being separate and apart from the second image area.

9. The system according to claim 8, wherein said blending mechanism utilizes alpha blending.

10. The system according to claim 8, wherein the computing system is implemented in hardware including a Field Programmable Gate Array (FPGA).

11. The system according to claim 8, wherein the computing system is implemented in semiconductor hardware.

12. The system according to claim 8, wherein the computing system is implemented in software.

\* \* \* \* \*